(12) United States Patent
Inumaru

(10) Patent No.: US 8,422,422 B2
(45) Date of Patent: Apr. 16, 2013

(54) MULTIPLEXED COMMUNICATION SYSTEM AND MULTIPLEXED COMMUNICATION METHOD

(75) Inventor: Tadayoshi Inumaru, Tokyo (JP)

(73) Assignee: NEC Corporation, Tokyo (JP)

( * ) Notice: Subject to any disclaimer, the term of this patent is extended or adjusted under 35 U.S.C. 154(b) by 867 days.

(21) Appl. No.: 12/256,131

(22) Filed: Oct. 22, 2008

(65) Prior Publication Data

US 2009/0103504 A1 Apr. 23, 2009

(30) Foreign Application Priority Data

Oct. 23, 2007 (JP) ................................. 2007-274850

(51) Int. Cl.
| | |
|---|---|
| H04W 4/00 | (2009.01) |
| H04L 12/26 | (2006.01) |
| H04L 12/28 | (2006.01) |
| H04J 3/02 | (2006.01) |

(52) U.S. Cl.
USPC ............ 370/328; 370/252; 370/537; 370/394

(58) Field of Classification Search .................... 370/393
See application file for complete search history.

(56) References Cited

U.S. PATENT DOCUMENTS

| | | | | |
|---|---|---|---|---|
| 6,792,006 | B1 * | 9/2004 | Kumaki et al. ............... | 370/537 |
| 7,593,744 | B2 * | 9/2009 | Majahan ....................... | 455/519 |
| 2004/0184426 | A1 | 9/2004 | Tan | |
| 2005/0185619 | A1 | 8/2005 | Niemera et al. | |
| 2007/0201463 | A1 * | 8/2007 | Morita ........................ | 370/389 |
| 2007/0253421 | A1 * | 11/2007 | Cai .............................. | 370/394 |
| 2010/0309798 | A1 * | 12/2010 | Fodor et al. ................... | 370/252 |

FOREIGN PATENT DOCUMENTS

WO 9916266 A 4/1999

OTHER PUBLICATIONS

"3GPP TS 36.300 V8.1.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", Jun. 2007, pp. 1-106.
"3GPP TS 29.060 V8.0.0 3rd Generation Partnership Project; Technical Specification Group Core Network and Terminals; General Packet Radio Service (GPRS); GPRS Tunnelling Protocol (GTP) Across the Gn and Gp Interface (Release 8)", Jun. 2007, pp. 1-143.
"3GPP TS 25.933 V5.4.0 3rd Generation Partnership Project; Technical Specification Group Radio Access Network; IP Transport in UTRAN (Release 5)", Dec. 2003, pp. 1-138.
EP Search Report for EP 08 01 8499 completed Jan. 12, 2009.

* cited by examiner

*Primary Examiner* — Ian N Moore
*Assistant Examiner* — Brian T Le

(57) ABSTRACT

A transmission processing apparatus selects, based on flow control information, user packets to be multiplexed, stores the user packets in the payload of a multiplexed packet based on the position order of multiplex flags corresponding to destination users, stores a multiplex flag group in which only the multiplex flags of the user packets are set in the header of the multiplexed packet, and transmits the multiplexed packet. A reception processing apparatus extracts the multiplex flag group from the header of the received multiplexed packet, transmits flow control information according to the storage state of a reception buffer to the transmission processing apparatus, demultiplexes the user packets from the payload of the multiplexed packet, extracts destination user information corresponding to the set multiplex flags from user management information, and outputs the user packets to the destination users corresponding to the user management information.

7 Claims, 6 Drawing Sheets

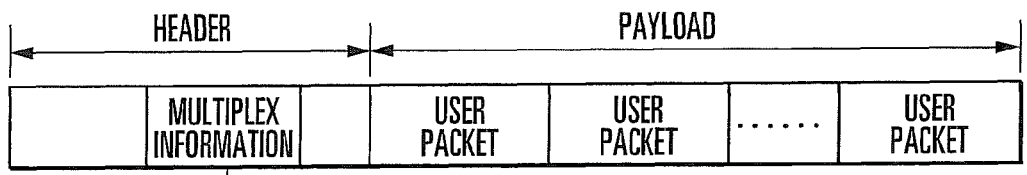
FIG. 3
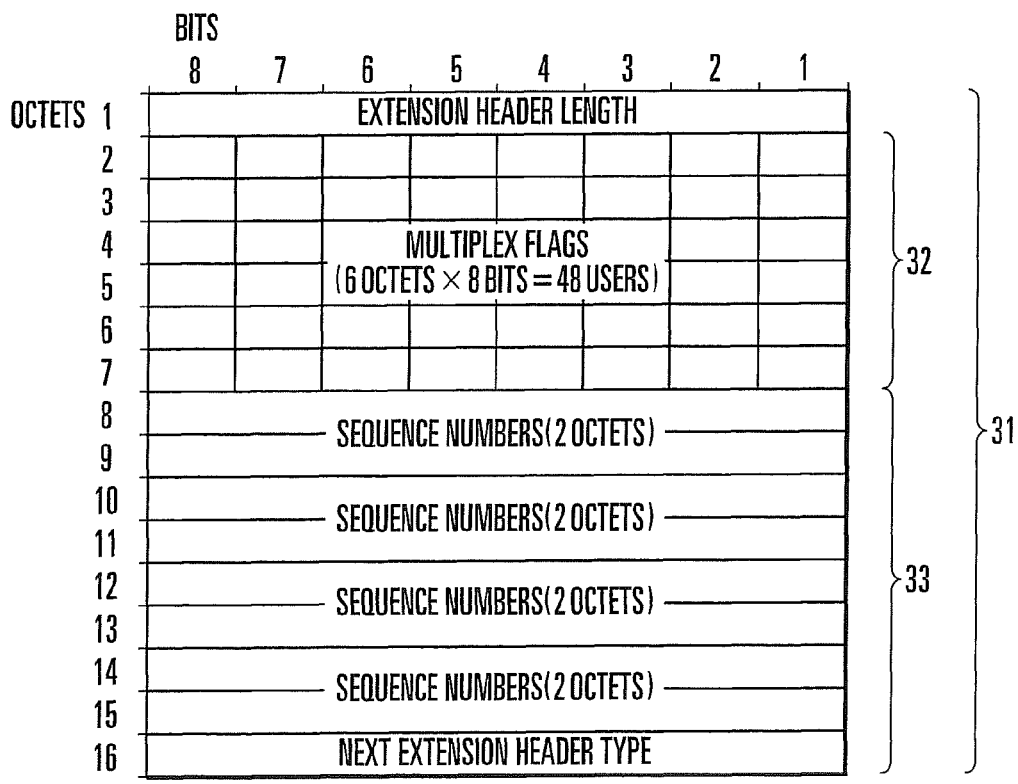
FIG. 4
FIG. 5

MULTIPLEXED COMMUNICATION SYSTEM AND MULTIPLEXED COMMUNICATION METHOD

This application is based upon and claims the benefit of priority from Japanese patent application No. 2007-274850, filed on Oct. 23, 2007, the disclosure of which is incorporated herein in its entirety by reference.

BACKGROUND OF THE INVENTION

The present invention relates to a multiplexing technique and, more particularly, to a packet multiplexing technique of multiplexing packets and transferring a multiplexed packet.

The IP (Internet Protocol) which has been spread widely among computer networks transfers an Internet diagram from a transmission source host to a destination host but does not support sequencing or flow control. This protocol also transfers data in a size complying with a request from a host application.

The LTE (Long Term Evolution) communication technique which is defined by 3GPP (3rd Generation Partnership Project) as one of high-speed data communication specifications for portable phones has suggested to transfer a user IP packet having the above-described characteristic via a logical transmission path formed by tunneling using GTP-U (GPRS Tunneling Protocol for User plane) (concerning LTE, see "3GPP TS36.300 v8.1.0 2007-07-17, Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", and concerning GTP-U, see "3GPP TS29.060 v8.0.0 2007-06-22, 3GPP; Technical Specification Group Core Network and Terminals; General Packet Radio Service (GPRS); GPRS Tunneling Protocol (GTP), across the Gn and Gp interface (Release 8)"). There is also suggested to use VoIP to transfer a CS (Circuit Switch) call used as a voice communication system in 3GPP (from rel'99).

In, e.g., a voice codec of AMR (Advanced Multi Rate) scheme, user data of 12.2 kbps has a payload length of 31 bytes (40 bytes when the header and the like are taken into consideration) at an interval of 20 ms. For this reason, when transferring packets of a service which uses a narrow band but is time critical (ensures real-time processing), like VoIP, an enormous number of small-sized packets are delivered on an S1/X2 interface in accordance with the number of users. This may increase the process load of each node or degrade the transmission efficiency of the network due to overhead of IP/UDP headers.

That is, when a communication system for multiplexing user IP packets and transferring a multiplexed packet, like the S1/X2 interface of the LTE communication technique, is applied to a broadband IP network, and a lot of small packets are transferred, as in VoIP, overhead of headers degrades the transmission efficiency.

Against this backdrop, protocols for CIP (Channel Interface Processor) and MPLS (Multi-Protocol Label Switching) have been proposed as methods of multiplexing small-size IP packets in 3GPP (concerning CIP and MPLS, see "3GPP TS25.933 v5.4.0 2004-01-13, Technical Specification Group Radio Access Network; IP transport in UTRAN (Release 5)").

SUMMARY OF THE INVENTION

In such a technique, however, it is necessary in both CIP and MPLS to insert a new protocol in an existing protocol stack. This may increase the cumbersomeness and delay time in processing. Additionally, since the packet transfer amount cannot be controlled in accordance with the use states of radio channels, it is impossible to efficiently use the network band.

In, e.g., CIP, a packet having a large size is fragmented. In a narrow-band network, this suppresses a fluctuation in transmission delay of small time-critical packets, which is caused by transmission delay of large packets. In a network having a relatively wide band as in the 3GPP/LTE communication technique, however, overhead of headers occurs due to the fragmentation, resulting in degradation in the band use efficiency.

In MPLS, the protocol is inserted in the lower layer of IP. Hence, a popular IP network cannot directly be applied. System construction by carriers and, more particularly, channel selection between nodes may be restricted, affecting the installation locations or coverage areas.

In these methods, if data is transferred using a protocol such as UDP without flow control in the upper layer, the transmission node one-sidedly controls the transfer amount. It is therefore impossible to efficiently transfer packets in accordance with the use states (congestion states) of reception nodes and, more particularly, radio channels. That is, burst communication occurs. Since each reception node needs to have a buffer for burst communication, the receiving-side platform (memory capacity and processing performance) may increase.

It is therefore an exemplary object of the invention to make it possible to multiplex packets and transfer a multiplexed packet by extending an existing protocol instead of inserting a new protocol.

A multiplexed communication system according to an exemplary aspect of the invention includes a transmission processing apparatus and a reception processing apparatus which perform packet communication via a communication network based on GTP-U (GPRS Tunneling Protocol for User plane) defined by an LTE (Long Term Evolution) communication technique of 3GPP (3rd Generation Partnership Project), the transmission processing apparatus including a storage unit which stores user management information representing a correspondence relationship between destination user information to identify a destination user of a user packet and a multiplex flag position of the destination user, a packet input unit which temporarily stores an input user packet in an input buffer, a header analyzing unit which extracts, from a header of the input user packet, attribute information containing a packet size of the user packet, a multiplexed packet combination selection unit which selects, based on the attribute information extracted by the header analyzing unit and flow control information according to a storage state of a reception buffer sent from the reception processing apparatus, user packets to be multiplexed into a new multiplexed packet from user packets stored in the input buffer, and a packet multiplexing unit which reads out the user packets selected by the multiplexed packet combination selection unit from the input buffer, stores the user packets in a payload of the multiplexed packet based on an order of multiplex flag positions corresponding to the destination users of the user packets registered in the user management information read out from the storage unit, stores, in a header of the multiplexed packet as header extension information based on the LTE communication technique, a multiplex flag group in which, out of multiplex flags provided for the respective destination users, multiplex flags corresponding to the destination users of the user packets selected by the multiplexed packet combination selection unit are set, and remaining multiplex flags are reset, and transmits the multiplexed packet to the reception processing apparatus via the communication network, and the reception processing apparatus including a storage unit which stores user management information representing a correspondence relationship between destination user information to identify a destination user of a user packet and a multiplex flag position of the destination user, a packet reception unit which temporarily stores, in the reception buffer, a multiplexed packet received from the transmission processing apparatus, a header analyzing unit which extracts, from a header of the multiplexed packet, a multiplex flag group stored as header extension information based on the LTE communication technique, and transmits the flow control information according to the storage state of the reception buffer to the transmission processing apparatus, and a packet demultiplexing unit which demultiplexes user packets from a payload of the multiplexed packet read out from the reception buffer, extracts, from the user management information read out from the storage unit, destination user information corresponding to set multiplex flags out of the multiplex flag group extracted by the header analyzing unit, and outputs the user packets to the destination users of the destination user information corresponding to the multiplex flags based on a correspondence relationship between a position order of the multiplex flags and a storage order of the user packets in the payload.

BRIEF DESCRIPTION OF THE DRAWINGS

FIG. 3 is a view showing an example of the configuration of user management information;

FIG. 4 is a view showing an example of the configuration of a multiplexed packet;

FIG. 5 is a view showing an example of the configuration of multiplex information;

EXEMPLARY EMBODIMENT

Figure 1:
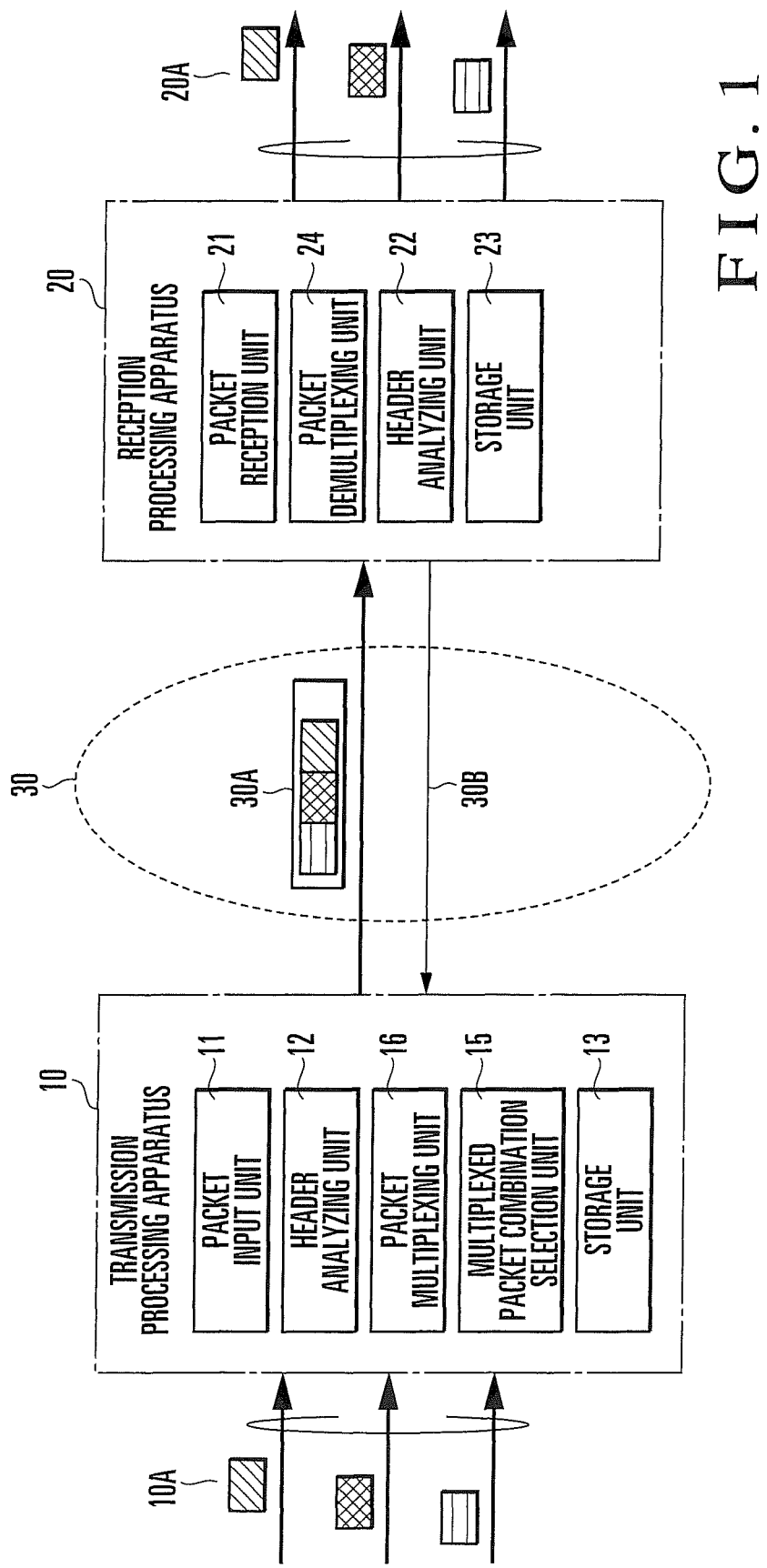
FIG. 1 is a block diagram showing the arrangement of a multiplexed communication system according to the first exemplary embodiment of the present invention.

The exemplary embodiments of the present invention will now be described with reference to the accompanying drawings.
[Multiplexed Communication System]
A multiplexed communication system according to the first exemplary embodiment of the present invention will be described with reference to FIG. 1. FIG. 1 shows the arrangement of the multiplexed communication system according to the first exemplary embodiment of the present invention.

The multiplexed communication system includes a transmission processing apparatus 10 and a reception processing apparatus 20, which perform packet communication via a communication network 30 based on GTP-U defined by the 3GPP/LTE communication technique. The transmission processing apparatus 10 has a function of multiplexing input user packets 10A having different destinations into a multiplexed packet 30A and transmitting it. The reception processing apparatus 20 has a function of receiving the multiplexed packet 30A from the transmission processing apparatus 10, demultiplexing user packets 20A multiplexed in the multiplexed packet 30A, and outputting the user packets 20A.

The transmission processing apparatus 10 and the reception processing apparatus 20 are installed in a packet transfer apparatus included in the communication network 30. A detailed example of the communication network 30 is a packet communication network such as the core network of a GPRS (General Packet Radio Service) system. A detailed example of the packet transfer apparatus is a node such as a gateway or an exchange, which multiplexes user packets and transfers a multiplexed packet using a tunneling technique such as GTP-U defined by the 3GPP/LTE communication technique. The transmission processing apparatus 10 and the reception processing apparatus 20 can be installed either separately in different nodes or in a single node.

In this exemplary embodiment, the transmission processing apparatus 10 selects user packets of multiplex targets based on flow control information 30B, stores the user packets in the payload of a multiplexed packet based on the position order of multiplex flags corresponding to destination users, stores, in the header of the multiplexed packet, a multiplex flag group in which only the multiplex flags of the user packets are set, and then transmits the multiplexed packet.

The reception processing apparatus 20 extracts the multiplex flag group from the header of the received multiplexed packet 30A, transmits flow control information corresponding to the storage state of the reception buffer to the transmission processing apparatus 10, demultiplexes the user packets from the payload of the multiplexed packet, extracts pieces of destination user information corresponding to the set multiplex flags from user management information, and outputs the user packets to the destination users corresponding to the user management information.
[Transmission Processing Apparatus]

Figure 2:
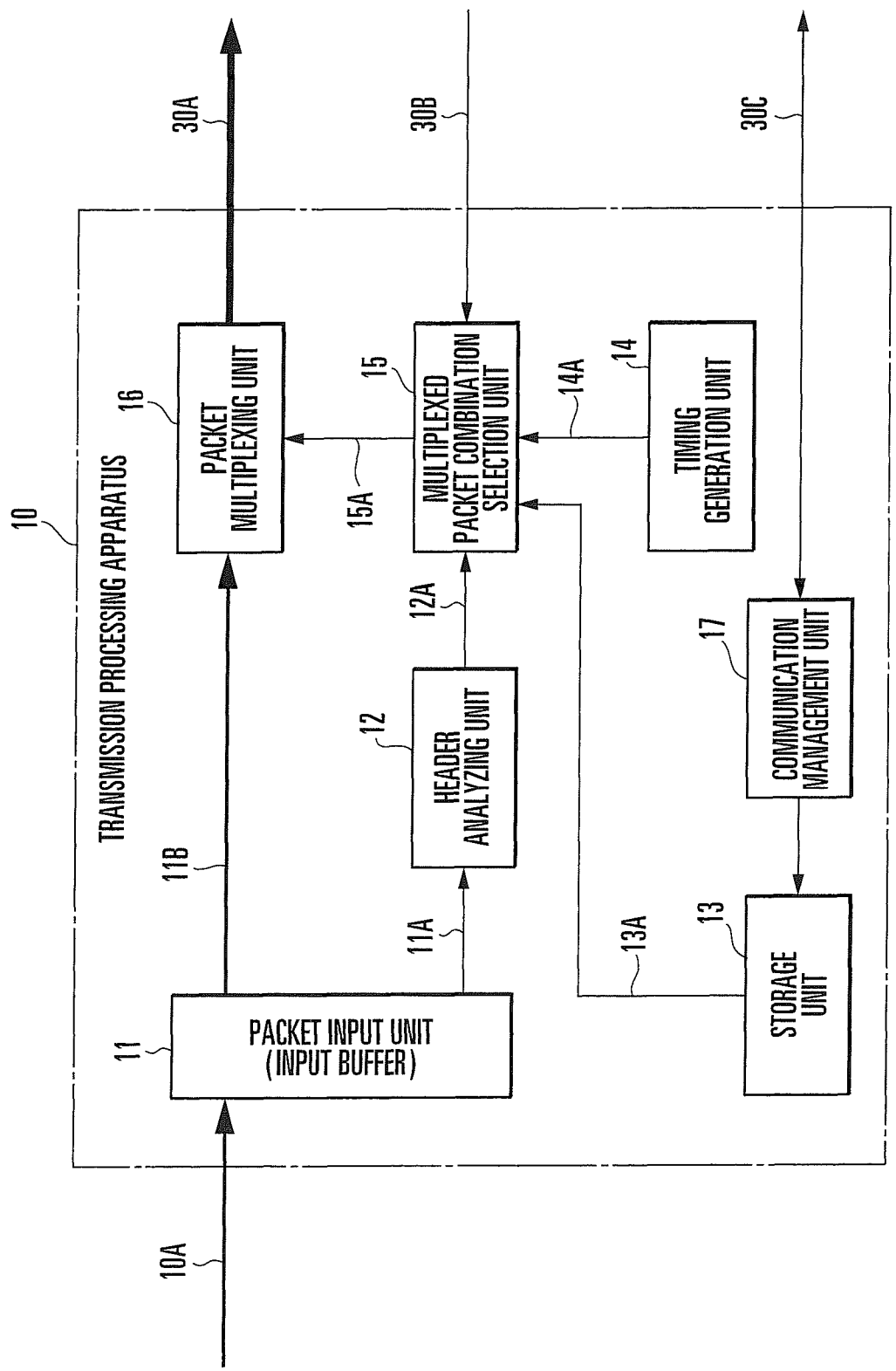
FIG. 2 is a block diagram showing the arrangement of a transmission processing apparatus used in the multiplexed communication system according to the first exemplary embodiment of the present invention.

The arrangement of the transmission processing apparatus used in the multiplexed communication system according to the first exemplary embodiment of the present invention will be described next in detail with reference to FIG. 2. FIG. 2 shows the arrangement of the transmission processing apparatus used in the multiplexed communication system according to the first exemplary embodiment of the present invention.

The transmission processing apparatus 10 is formed from a packet transfer apparatus as a whole and has a function of multiplexing the input user packets 10A having different destinations into the multiplexed packet 30A and transmitting it.

The transmission processing apparatus 10 includes, as main functional units, a packet input unit 11, header analyzing unit 12, storage unit 13, timing generation unit 14, multiplexed packet combination selection unit 15, packet multiplexing unit 16, and communication management unit 17. These functional units can be implemented by dedicated circuit units. Alternatively, all or some of arbitrary functional units may be implemented by an information processing unit including a CPU and its peripheral circuits.

The packet input unit 11 includes an input buffer (not shown). The packet input unit 11 has a function of receiving the user packet 10A input from a node or a user terminal via a communication line and temporarily storing it in the input buffer, a function of reading out header information 11A of the stored user packet 10A from the input buffer and outputting the header information, and a function of reading out, from the input buffer, a user packet 11B designated by the packet multiplexing unit 16 and outputting it.

The header analyzing unit 12 has a function of extracting the packet size of the user packet from the header information 11A output from the packet input unit 11, a function of extracting, from the header information 11A, internal identification information to identify the user packet from other user packets in the input buffer, a function of extracting destination user information representing the destination user of the user packet from the header information 11A, and a function of outputting attribute information 12A containing the packet size, internal identification information, and destination user information.

The storage unit 13 has a function of storing communication management information 30C to be used for user packet multiplexing in the transmission processing apparatus 10. The communication management information 30C stored in the storage unit 13 mainly contains user management information 13A.

The user management information 13A includes various kinds of information about the destination user of each user packet to be multiplexed. The user management information 13A is exchanged and matched in advance between the transmission processing apparatus 10 and the reception processing apparatus 20 via the communication management unit 17 and stored in the storage unit 13.

FIG. 3 shows an example of the configuration of user management information. In this example, the user management information has a set of a G-TEID (Group-TEID: group identifier) which is provided for each destination user of a multiplex target and includes an identifier representing the group of the destination user, destination user information unique to the destination user, a multiplex flag position corresponding to the destination user, and weight information associated with the destination user. As the destination user information, the destination address of the user packet or an identifier to identify an IP tunnel corresponding to the user packet, such as TEID (Tunnel Endpoint IDentifier) of GTP-U, is used.

The multiplex flag is 1-bit flag information which represents the presence/absence of multiplexing into a multiplexed packet for each destination user registered in the user management information 13A. The multiplex flag is stored in the header of each multiplexed packet. The multiplex flag position is information representing a bit position where the multiplex flag is stored.

The weight information is a value representing the selection frequency or selection priority order in selecting a multiplex candidate from the user packets. The larger the weight information value is, the higher the probability of selecting the user packet as a multiplex candidate is. QoS (Quality of Service) control of each destination user may be done based on the weight information.

FIG. 4 shows an example of the configuration of a multiplexed packet. As shown in FIG. 4, the multiplexed packet includes a header and a payload, like a general IP packet. In this exemplary embodiment, user packets are stored in the payload, and multiplex information 31 about the user packets is stored in part of the header as header extension information.

FIG. 5 shows an example of the configuration of multiplex information. As shown in FIG. 5, the multiplex information 31 has a multiplex flag area 32 and a sequence number area 33. In the 3GPP/LTE communication technique, when storing header extension information in the packet header, length information "Extension Header Length" of the multiplex information 31 is added to the first octet of the multiplex information 31, whereas an identifier "Next Extension Header Type" representing the end of the multiplex information 31 is added to the final octet.

Of the multiplex information 31, the bit positions of the multiplex flags provided in the multiplex flag area 32 are assigned to the destination users registered in the user management information 13A in a one-to-one correspondence in advance. It is possible to confirm based on the set (=1: present)/reset (=0: absent) state of a multiplex flag whether the user packet of a corresponding destination user is multiplexed into the multiplexed packet.

In FIG. 5, multiplex flags of 6 octets are provided in the multiplex flag area 32. It is therefore possible to make notifications about the presence/absence of multiplexing of user packets of a total of 48 (=6 octets×8 bits) destination users.

Hence, when multiplexing, e.g., four user packets, out of the multiplex flags, only those corresponding to the destination users of the user packets are set in the set state. All the remaining multiplex flags are set in the reset state.

The user packets are stored sequentially from the top of the payload based on the arrangement position order of the multiplex flags in the multiplex flag area 32. For this reason, the user packet and the sequence number of a destination user corresponding to the first multiplex flag in the set state, i.e., the multiplex flag which appears first from the top in the arrangement order from the first bit position (the first bit of the first octet) to the final bit position (the eights bit of the final octet) of the multiplex flag area 32 are respectively stored in the payload and at the top position of the sequence number area 33. The user packet and the sequence number of a destination user corresponding to the second multiplex flag from the top are respectively stored in the payload and at the second position of the sequence number area 33.

The timing generation unit 14 has a function of outputting a processing timing signal representing the processing period of user packet multiplexing and transmission.

The multiplexed packet combination selection unit 15 has a function of receiving the flow control information 30B sent from the reception processing apparatus 20 via the communication network 30, a function of selecting, based on the attribute information 12A output from the header analyzing unit 12 and the user management information 13A read out from the storage unit 13, a combination of user packets to be multiplexed into a new multiplexed packet at the period of a processing timing signal 14A from the timing generation unit 14, a function of aligning pieces of internal identification information representing the user packets to be multiplexed according to the selection result on the basis of the position order of the multiplex flags of the destination users registered in the user management information 13A, and a function of outputting multiplex combination information including the aligned pieces of internal identification information and the multiplex flag group associated with the destination users.

The packet multiplexing unit 16 has a function of reading out, from the packet input unit 11, the user packets 11B corresponding to the internal identification information group designated by multiplex combination information 15A output from the multiplexed packet combination selection unit 15, a function of storing the multiplex flag group designated by the multiplex combination information 15A in the multiplex flag area 32 of the multiplex information 31 provided in the header of a new multiplexed packet as header extension information based on the 3GPP/LTE communication technique, a function of extracting sequence numbers from the user packets 11B and storing them in the sequence number area 33 of the multiplex information 31 in an order corresponding to the arrangement order of the multiplex flags of the destination users, a function of storing the user packets 11B in the payload of the new multiplexed packet in an order corresponding to the arrangement order of the multiplex flags of the destination users, and a function of transmitting the thus generated new multiplexed packet 30A to the reception processing apparatus 20 via the communication network 30.

The communication management unit 17 has a function of exchanging, with the reception processing apparatus 20 via the communication network 30, TEID serving as an identifier for multiplexed communication of GTP-U and the communication management information 30C including the maximum number of packets storable in one multiplexed packet in the multiplexed communication as well as the user management information 13A associated with the multiplexed communication, and a function of storing the extracted communication management information 30C in the storage unit 13 in call connection processing at the start of the multiplexed communication with the reception processing apparatus 20. A host management apparatus (not shown) may be provided so that the communication management unit 17 receives the communication management information 30C and stores it in the storage unit 13 based on a command from the host management apparatus.

[Reception Processing Apparatus]

Figure 6:
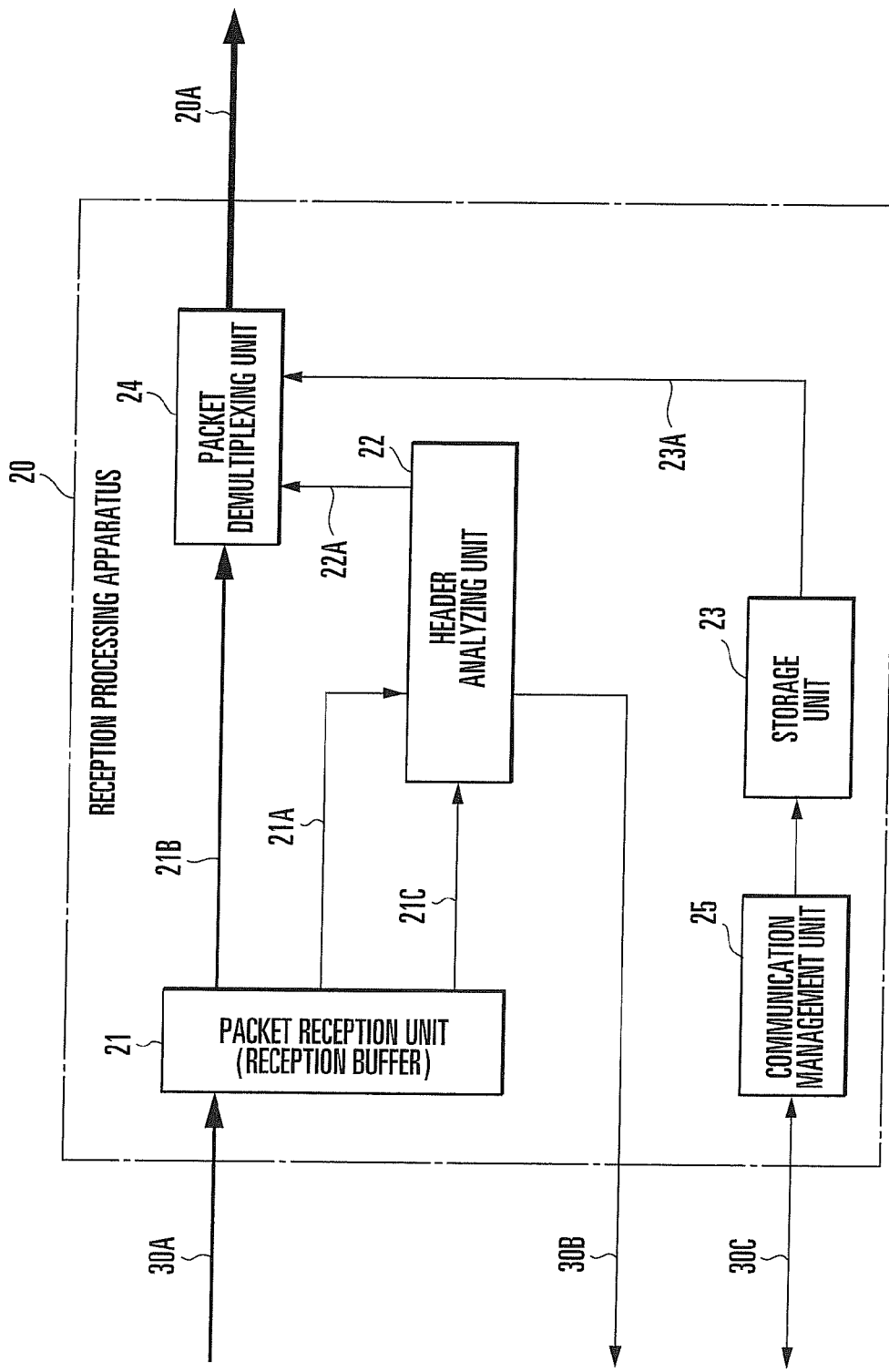
FIG. 6 is a block diagram showing the arrangement of a reception processing apparatus used in the multiplexed communication system according to the first exemplary embodiment of the present invention.

The arrangement of the reception processing apparatus used in the multiplexed communication system according to the first exemplary embodiment of the present invention will be described next in detail with reference to FIG. 6. FIG. 6 shows the arrangement of the reception processing apparatus used in the multiplexed communication system according to the first exemplary embodiment of the present invention.

The reception processing apparatus 20 is formed from a packet transfer apparatus as a whole and has a function of demultiplexing the user packet 20A from the received multiplexed packet 30A and outputting it.

The reception processing apparatus 20 includes, as main functional units, a packet reception unit 21, header analyzing unit 22, storage unit 23, packet demultiplexing unit 24, and communication management unit 25. These functional units can be implemented by dedicated circuit units. Alternatively, all or some of arbitrary functional units may be implemented by an information processing unit including a CPU and its peripheral circuits.

The packet reception unit 21 includes a reception buffer (not shown). The packet reception unit 21 has a function of receiving the multiplexed packet 30A transmitted from the transmission processing apparatus 10 and temporarily storing it in the reception buffer, a function of reading out header information 21A of the stored multiplexed packet 30A from the reception buffer and outputting the header information, a function of reading out, from the reception buffer, a multiplexed packet 21B designated by the packet demultiplexing unit 24 and outputting it, and a function of outputting a storage state 21C of the reception buffer.

The header analyzing unit 22 has a function of analyzing the header information 21A output from the packet reception unit 21, a function of extracting, based on the analysis result, the multiplex information 31 serving as header extension information based on the 3GPP/LTE communication technique from the header information 21A and outputting it as multiplex combination information 22A, and a function of generating the flow control information 30B based on the storage state 21C output from the packet reception unit 21 and transmitting it to the transmission processing apparatus 10.

The storage unit 23 has a function of storing the communication management information 30C to be used for user packet demultiplexing in the reception processing apparatus 20. The communication management information 30C stored in the storage unit 23 mainly contains user management information 23A.

The user management information 23A includes various kinds of information about the destination user of each user packet to be multiplexed. The user management information 23A is exchanged in advance between the transmission processing apparatus 10 and the reception processing apparatus 20 via the communication management unit 25 and stored in the storage unit 23. More specifically, the user management information 23A includes a set of destination user information uniquely provided for a destination user, and a multiplex flag position corresponding to the destination user, like the above-described user management information 13A shown in FIG. 3.

The packet demultiplexing unit 24 has an output buffer. The packet demultiplexing unit 24 has a function of reading out a corresponding multiplexed packet 21B from the reception buffer of the packet reception unit 21 based on the multiplex combination information 22A output from the header analyzing unit 22, a function of demultiplexing user packets from the payload of the multiplexed packet 21B, a function of extracting sequence numbers corresponding to the user packets from the user management information 23A read out from the storage unit 23, a function of extracting destination user information corresponding to the position of each set multiplex flag out of the multiplex flags of the destination users included in the multiplex combination information 22A, a function of associating the user packets with the extracted destination user information based on the correspondence relationship between the position order of the multiplex flags and the storage order of the user packets in the payload, and a function of storing, in the output buffer, the user packets 20A corresponding to the individual destination users in an order according to the sequence numbers and sequentially outputting, via a communication line, each user packet to a node or a user terminal that is a destination corresponding to the destination user information.

The communication management unit 25 has a function of exchanging, with the transmission processing apparatus 10 via the communication network 30, TEID serving as an identifier for multiplexed communication of GTP-U and the communication management information 30C including the maximum number of packets storable in one multiplexed packet in the multiplexed communication as well as the user management information 23A associated with the multiplexed communication, and a function of storing the extracted communication management information 30C in the storage unit 23 in call connection processing at the start of the multiplexed communication with the transmission processing apparatus 10. A host management apparatus (not shown) may be provided so that the communication management unit 25 receives the communication management information 30C and stores it in the storage unit 23 based on a command from the host management apparatus.

[Operation of Transmission Processing Apparatus]

Figure 7:
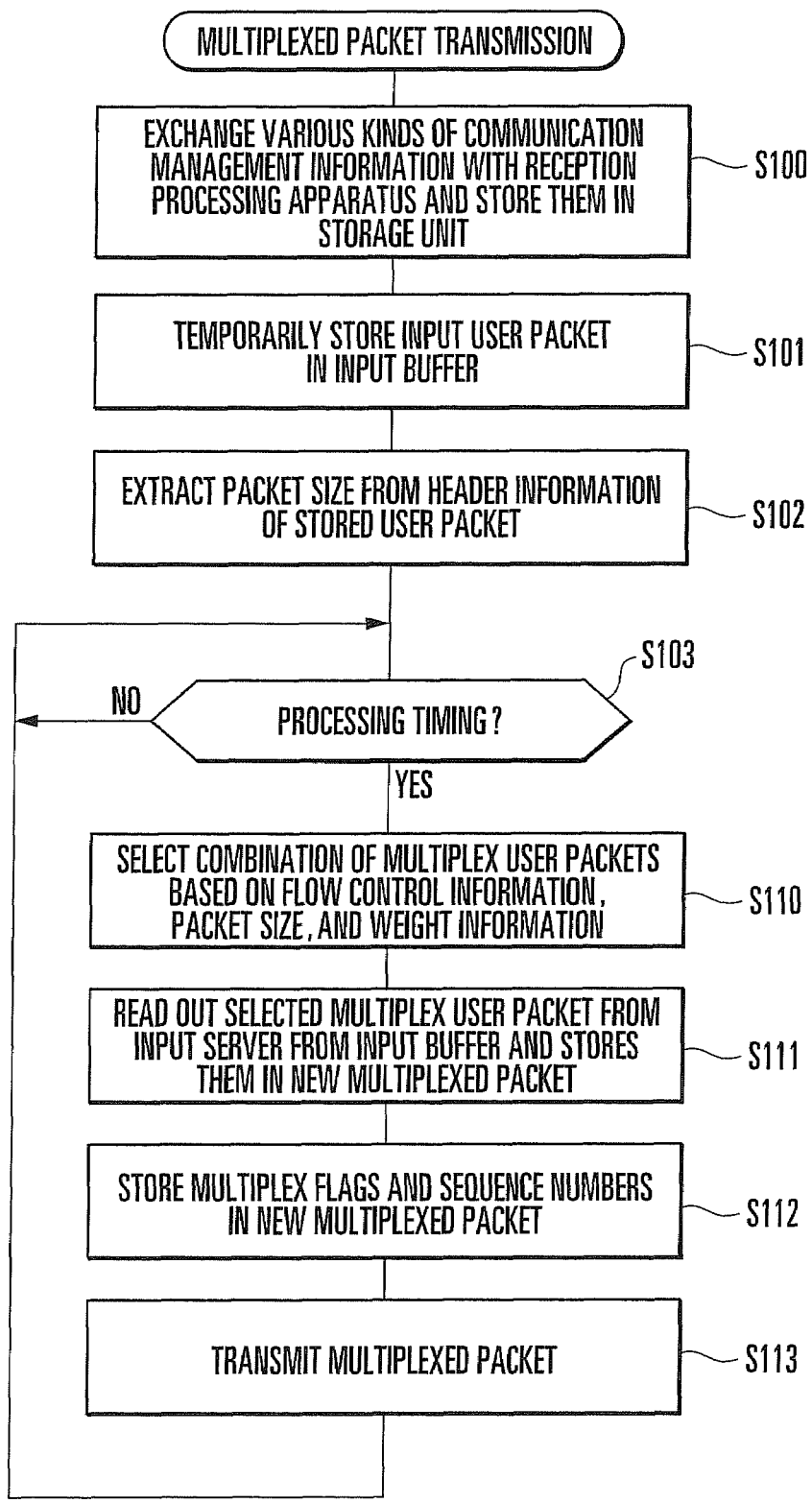
FIG. 7 is a flowchart illustrating multiplexed packet transmission processing of the transmission processing apparatus used in the multiplexed communication system according to the first exemplary embodiment of the present invention.

The operation of the transmission processing apparatus used in the multiplexed communication system according to the first exemplary embodiment of the present invention will be described next in detail with reference to FIG. 7. FIG. 7 illustrates multiplexed packet transmission processing of the transmission processing apparatus used in the multiplexed communication system according to the first exemplary embodiment of the present invention.

In the multiplexed packet transmission processing shown in FIG. 7, the transmission processing apparatus 10 causes the communication management unit 17 to exchange the communication management information 30C including the user management information 13A with the reception processing apparatus 20 and store the communication management information in the storage unit 13 in call connection processing at the start of multiplexed communication with the reception processing apparatus 20 (step S100).

Next, the transmission processing apparatus 10 causes the packet input unit 11 to start processing of sequentially receiving the user packet 10A input from a node or a user terminal via a communication line and temporarily storing it in the input buffer (step S101).

The transmission processing apparatus 10 causes the header analyzing unit 12 to start processing of extracting the packet size of the user packet, internal identification information to identify the user packet from other user packets in the input buffer, and destination user information associated with the destination user of the user packet from the header information 11A output from the packet input unit 11, and outputting the attribute information 12A containing the packet size, internal identification information, and destination user information (step S102).

Next, the transmission processing apparatus 10 causes the multiplexed packet combination selection unit 15 to check the coming of processing timing based on the processing timing signal 14A from the timing generation unit 14 (step S103). If the processing timing has come (YES in step S103), the multiplexed packet combination selection unit 15 selects a combination of user packets to be multiplexed into a new multiplexed packet (step S110).

At this time, the multiplexed packet combination selection unit 15 adjusts, on the basis of the flow control information 30B sent from the transmission processing apparatus 10 via the communication network 30, the number of user packets to be stored in the new multiplexed packet. More specifically, the total size of user packets storable in the new multiplexed packet is controlled to be equal to or smaller than the remaining storage capacity of the reception buffer notified by the flow control information 30B. Note that the maximum number of user packets (maximum packet data amount) storable in one multiplexed packet may be determined by the communication management information 30C in advance and used as the upper limit of the number of user packets to be stored in the new multiplexed packet.

Hence, the multiplexed packet combination selection unit 15 selects user packets to be multiplexed into the new multiplexed packet from, e.g., several candidate user packets selected based on the weight information of the user management information 13A read out from the storage unit 13 such that the total size of them becomes equal to or smaller than the remaining storage capacity of the reception buffer based on the packet size of each candidate user packet, which is included in the attribute information 12A output from the header analyzing unit 12.

To select candidate user packets on the basis of weight information, a general known selection method is used. For example, candidate user packets are selected based on the selection frequency or selection priority order according to the weight information.

If the used amount of the reception buffer in the reception processing apparatus 20 exceeds a predetermined threshold value due to, e.g., a poorer radio channel condition, adjustment is done by, e.g., carrying the user packets of arbitrary destination users to the next time. As a result, the transmission rate of multiplexed communication is adjusted.

The multiplexed packet combination selection unit 15 thus selects a combination of user packets to be multiplexed and then rearranges the pieces of internal identification information of the user packets to be multiplexed, which are included in the attribute information 12A, in accordance with the position order of the multiplex flags associated with the destination users of the user packets, which is defined by the user management information 13A. The set/reset state is set for the multiplex flag of each destination user based on the selection result of the user packets to be multiplexed, thereby generating a multiplex flag group of bitmap format in the multiplex flag area 32 shown in FIG. 5. Multiplex combination information including the internal identification information and the multiplex flag group is output to the packet multiplexing unit 16.

Subsequently, the transmission processing apparatus 10 causes the packet multiplexing unit 16 to read out, from the packet input unit 11, the user packets 11B corresponding to the internal identification information designated by multiplex combination information 15A output from the multiplexed packet combination selection unit 15, and store the user packets 11B in the payload of the new multiplexed packet (step S111).

At this time, the packet multiplexing unit 16 stores the user packets 11B in the payload in an order corresponding to the arrangement order of the multiplex flags of the destination users, and in this case, in an order corresponding to the arrangement of the internal identification information.

The transmission processing apparatus 10 also causes the packet multiplexing unit 16 to rearrange the sequence numbers extracted from the user packets 11B in an order corresponding to the arrangement order of the multiplex flags of the destination users, i.e., in the same storage order as that of the user packets 11B and store the multiplex flag group and the sequence number group associated with the destination users designated by the multiplex combination information 15A in the multiplex flag area 32 and the sequence number area 33 of the multiplex information 31 provided in the header of the new multiplexed packet as header extension information based on the 3GPP/LTE communication technique (step S112).

After the new multiplexed packet 30A is generated in this way, the transmission processing apparatus 10 causes the packet multiplexing unit 16 to transmit the multiplexed packet 30A to the reception processing apparatus 20 via the communication network 30 (step 113). Then, the process returns to step S103 to wait for the next processing timing.

[Operation of Reception Processing Apparatus]

Figure 8:
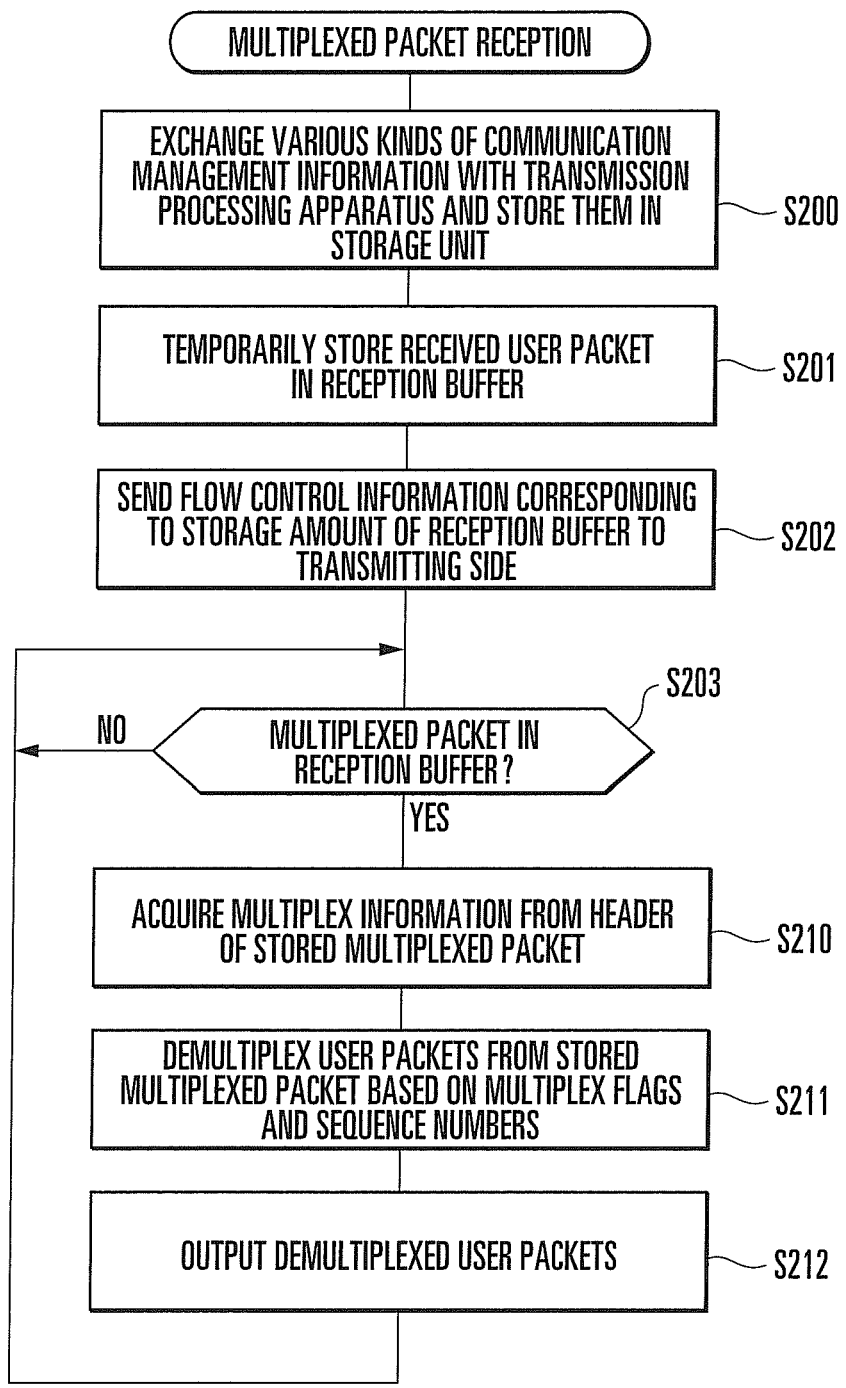
FIG. 8 is a flowchart illustrating multiplexed packet reception processing of the reception processing apparatus used in the multiplexed communication system according to the first exemplary embodiment of the present invention.

The operation of the reception processing apparatus used in the multiplexed communication system according to the first exemplary embodiment of the present invention will be described next in detail with reference to FIG. 8. FIG. 8 illustrates multiplexed packet reception processing of the reception processing apparatus used in the multiplexed communication system according to the first exemplary embodiment of the present invention.

In the multiplexed packet reception processing shown in FIG. 8, the reception processing apparatus 20 causes the communication management unit 25 to exchange the communication management information 30C including the user management information 13A with the transmission processing apparatus 10 and store the communication management information in the storage unit 23 in call connection processing at the start of multiplexed communication with the transmission processing apparatus 10 (step S200).

Next, the reception processing apparatus 20 causes the packet reception unit 21 to start processing of sequentially receiving the multiplexed packet 30A transmitted from the transmission processing apparatus 10 via a communication line and temporarily storing it in the reception buffer (step S201).

The reception processing apparatus 20 causes the header analyzing unit 22 to start, at an arbitrary intermittent timing such as the reception timing of the multiplexed packet 30A, processing of extracting the storage state 21C of the reception buffer from the packet reception unit 21, generating the flow control information 30B representing the remaining storage capacity of the reception buffer based on the difference between the storage state 21C and the maximum storage capacity of the reception buffer, and transmitting the flow control information 30B to the transmission processing apparatus 10 (step S202).

Next, the reception processing apparatus 20 confirms whether a multiplexed packet is stored in the reception buffer (step S203). If an unprocessed multiplexed packet is stored (YES in step S203), the header analyzing unit 22 extracts the multiplex information 31, which is header extension information based on the 3GPP/LTE communication technique and including a multiplex flag group and a sequence number group, from the header information 21A of the multiplexed packet output from the packet reception unit 21, and outputs the multiplex information 31 as the multiplex combination information 22A (step S210).

Subsequently, the reception processing apparatus 20 causes the packet demultiplexing unit 24 to read out the corresponding multiplexed packet 21B from the reception buffer of the packet reception unit 21 based on the multiplex combination information 22A output from the header analyzing unit 22 and demultiplex the user packet 20A from the payload of the multiplexed packet 21B (step S211).

Next, the packet demultiplexing unit 24 extracts, from the user management information 23A in the storage unit 23, destination user information corresponding to the bit position of each multiplex flag in the set state out of the multiplex flags of the destination users included in the multiplex combination information 22A, and associates the demultiplexed user packet 20A with the extracted destination user information based on the correspondence relationship between the position order of the multiplex flags and the user packet storage order in the payload.

The user packets 20A are stored in the output buffer for the respective destination users in an order according to the sequence numbers of the user packets 20A included in the multiplex combination information 22A, and sequentially output to a node or a user terminal that is a destination corresponding to the destination user information via a communication line (step S212). Then, the process returns to step S203 to wait for the next multiplexed packet storage.

[Effects of First Exemplary Embodiment]

As described above, in this exemplary embodiment, the multiplex information which is necessary for multiplexing a plurality of user packets into one multiplexed packet is stored in the extension header newly defined in the header of the multiplexed packet. It is therefore possible to send the multiplex information from the transmission processing apparatus to the reception processing apparatus by existing GTP-U without inserting a newly defined protocol. This makes it possible to prevent any increase in processing delay caused by a newly added protocol and effectively use the communication band in multiplexed communication.

Additionally, the user packets to be multiplexed by the transmission processing apparatus are adjusted based on the flow control information sent from the reception processing apparatus. It is therefore possible to adjust the transmission rate in existing GTP-U without newly defining and inserting a protocol.

Hence, according to this exemplary embodiment, various problems which are posed when an enormous number of user packets having a relatively small size are transmitted can be solved without increasing the communication performance such as the memory capacity and processing performance in the platform of each node of the communication network. The above-described effects can be obtained by multiplexing even in data forwarding on an X2 interface by handover.

[Second Exemplary Embodiment]

A multiplexed communication system according to the second exemplary embodiment of the present invention will be described next.

In the first exemplary embodiment, an example has been described in which user packets for a plurality of destination users are multiplexed into one multiplexed packet and transferred. In the second exemplary embodiment, a case will be explained in which user packets for different destination users are transferred in parallel using different multiplexed packets.

In parallel multiplexed communication using different multiplexed packets between a transmission processing apparatus 10 and a reception processing apparatus 20, pieces of user management information 13A and 23A need to be set for each multiplexed packet. Additionally, since a plurality of correspondence relationships are generated between the destination users as multiplex targets and multiplex flag positions, it is necessary to specify each destination user using an appropriate correspondence relationship for each multiplexed packet.

In this exemplary embodiment, destination users as multiplex targets are put into groups in advance. G-TEID (Group-TEID: group identifier) is introduced as a new identifier for each group. User management information of each destination user is managed based on the G-TEID.

In this case, a G-TEID 34 of a group to which a destination user belongs is registered for each entry of destination users, as shown in FIG. 3.

Grouping of the destination users, i.e., the G-TEID of each destination user is defined in advance before the start of multiplexed communication between the transmission processing apparatus 10 and the reception processing apparatus 20 together with a TIED that is an identifier for the multiplexed communication by GTP-U and the maximum number of packets storable in one multiplexed packet in the multiplexed communication. Each G-TEID is exchanged between the transmission processing apparatus 10 and the reception processing apparatus 20 by communication management information 30C in call connection processing at the start of the multiplexed communication and stored in storage units 13 and 23.

In this exemplary embodiment, a multiplexed packet combination selection unit 15 of the transmission processing apparatus 10 has a function of, when selecting a multiplex user packet to be stored in a new multiplexed packet based on attribute information 12A and flow control information 30B, selecting a multiplex user packet from the user packets of destination users having the same group identifier based on the group identifier of the user management information 13A.

A packet multiplexing unit 16 has a function of storing, in the header of a user packet 2A, a group identifier corresponding to each user packet selected by the multiplexed packet combination selection unit 15.

A packet demultiplexing unit 24 of the reception processing apparatus 20 has a function of, when extracting destination user information from the user management information 23A, extracting, from destination user information having the same group identifier as that stored in a multiplexed packet 21B, destination user information corresponding to the bit position of each multiplex flag in the set state out of the multiplex flags extracted by a header analyzing unit 22.

The remaining functional units in the transmission processing apparatus 10 and the reception processing apparatus 20 of the multiplexed communication system according to this exemplary embodiment are almost the same as those of the first exemplary embodiment, and a detailed description thereof will not be repeated.

[Operation of Second Exemplary Embodiment]

The operations of the transmission processing apparatus and the reception processing apparatus included in the multiplexed communication system according to the second exemplary embodiment of the present invention will be described next in detail with reference to FIGS. 7 and 8 described above.

Multiplexed packet transmission processing of the transmission processing apparatus 10 will be described first with reference to FIG. 7. In step S100 of FIG. 7, the transmission processing apparatus 10 causes a communication management unit 17 to exchange the communication management information 30C including the user management information 13A with the reception processing apparatus 20 and store the communication management information in the storage unit 13. At this time, the G-TEIDs of groups to which the individual destination users belong are also stored in the storage unit 13 as part of the user management information 13A, as shown in FIG. 3.

In step S101, the transmission processing apparatus 10 causes a packet input unit 11 to start processing of sequentially receiving a user packet 10A and temporarily storing it in the input buffer. In step S102, the transmission processing apparatus 10 causes a header analyzing unit 12 to start processing of outputting the attribute information 12A containing the packet size and internal identification information.

Next, if a processing timing associated with an arbitrary G-TEID has come in step S103, the transmission processing apparatus 10 causes the multiplexed packet combination selection unit 15 to select a combination of user packets to be multiplexed into a new multiplexed packet having the G-TEID in step S110. At this time, the multiplexed packet combination selection unit 15 selects user packets corresponding to the G-TEID as candidate user packets from the input buffer and selects a user packet to be multiplexed into a new multiplexed packet from the candidate user packets. Based on the selection result, a multiplex flag group associated with the destination users having the G-TEID is generated.

Subsequently, in step S111, the transmission processing apparatus 10 causes a packet multiplexing unit 16 to read out, from the packet input unit 11, user packets 11B having the G-TEID which are selected by the multiplexed packet combination selection unit 15, and store the user packets 11B in the payload of the new multiplexed packet.

In step S112, the transmission processing apparatus 10 stores the multiplex flag group associated with the destination users having the G-TEID, which is generated by the multiplexed packet combination selection unit 15, and the sequence numbers of the user packets 11B in a multiplex flag area 32 and a sequence number area 33 of multiplex information 31 provided in the header of the new multiplexed packet as header extension information based on the 3GPP/LTE communication technique. At this time, the G-TEID is also stored in the header of the new multiplexed packet.

After a new multiplexed packet 30A is generated in this way, in step S113, the transmission processing apparatus 10 causes the packet multiplexing unit 16 to transmit the multiplexed packet 30A having the G-TEID to the reception processing apparatus 20 via a communication network 30. Then, the process returns to step S103 to wait for the next processing timing for an arbitrary G-TEID.

Multiplexed packet reception processing of the reception processing apparatus 20 will be described next with reference to FIG. 8. In step S200 of FIG. 8, the reception processing apparatus 20 causes a communication management unit 25 to exchange the communication management information 30C including the user management information 23A with the transmission processing apparatus 10 and store the communication management information in the storage unit 23. At this time, the G-TEIDs of groups to which the individual destination users belong are also stored in the storage unit 23 as part of the user management information 23A, as shown in FIG. 3.

Next, in step S201, the reception processing apparatus 20 causes a packet reception unit 21 to start processing of sequentially receiving the multiplexed packet 30A and temporarily storing it in the reception buffer. In step S202, the reception processing apparatus 20 causes the header analyzing unit 22 to start processing of generating the flow control information 30B corresponding to a storage state 21C of the reception buffer and transmitting the flow control information 30B to the transmission processing apparatus 10.

Next, if an unprocessed multiplexed packet is stored in the reception buffer step S203, in step S210, the reception processing apparatus 20 causes the header analyzing unit 22 to extract the multiplex information 31, which is header extension information based on the 3GPP/LTE communication technique and including a multiplex flag group and a sequence number group, from the header information 21A of the multiplexed packet and output the multiplex information 31 as multiplex combination information 22A (step S210).

After that, in step S211, the reception processing apparatus 20 causes a packet demultiplexing unit 24 to read out a corresponding multiplexed packet 21B from the packet reception unit 21 based on the multiplex combination information 22A output from the header analyzing unit 22 and demultiplex the user packet 20A from the payload of the multiplexed packet 21B (step S211).

Next, the packet demultiplexing unit 24 extracts the G-TEID from the header of the multiplexed packet 21B, extracts, from the user management information 23A in the storage unit 23, destination user information of a destination user corresponding to the bit position of each multiplex flag in the set state out of the multiplex flags included in the multiplex combination information 22A, and associates the demultiplexed user packet 20A with the extracted destination user information of the G-TEID based on the correspondence relationship between the position order of the multiplex flags and the user packet storage order in the payload.

The user packets 20A are stored in the output buffer for the respective destination users of corresponding destination user information in an order according to the sequence numbers of the user packets 20A included in the multiplex combination information 22A, and sequentially output to a node or a user terminal that is a destination corresponding to the destination user information via a communication line (step S212). Then, the process returns to step S203 to wait for the next multiplexed packet storage associated with an arbitrary G-TEID.

[Effects of Second Exemplary Embodiment]

As described above, in this exemplary embodiment, destination user information, multiplex flag positions, and the G-TEID of a group to which the destination users belong are registered in correspondence with each other by user management information. Only user packets having the same G-TEID are multiplexed into one multiplexed packet. For these reasons, even when a plurality of correspondence relationships are generated between the destination users and multiplex flag positions, it is possible to specify each destination user using an appropriate correspondence relationship for each multiplexed packet. Hence, the number of destination users to which packets can be transferred by the multiplexed communication system can easily be increased.

[Extension of Exemplary Embodiments]

In the above exemplary embodiments, an example has been described in which the remaining storage capacity of the entire reception buffer of the reception processing apparatus 20 is notified by the flow control information 30B. However, the present invention is not limited to this. For example, a communication condition associated with each destination user may be generated and notified by the flow control information 30B based on the remaining storage area of the output buffer of each destination user provided in the packet demultiplexing unit 24 or transfer rate information sent from a node or a user terminal that receives the user packet 20A. Hence, the multiplexed packet combination selection unit 15 of the transmission processing apparatus 10 can adjust the necessity of user packet multiplexing for each destination user based on the notification condition sent by the flow control information 30B and as a result, adjust the communication rate of each destination user.

In the above-described exemplary embodiments, the transmission processing apparatus 10 and the reception processing apparatus 20 may be connected to a device such as a GPS (Global Positioning System) capable of acquiring an absolute time via the communication management units 17 and 25 to exchange time stamps, thereby periodically calculating the network transmission time between the transmission and reception apparatuses and transmitting the latest flow control information 30B from the header analyzing unit 22 of the reception processing apparatus 20 in accordance with the processing timing signal 14A of the transmission processing apparatus 10. This allows the multiplexed packet combination selection unit 15 of the transmission processing apparatus 10 to select a multiplex user packet combination based on the latest storage state so that the margin amount of the reception buffer necessary for coping with a notification delay of the flow control information 30B can be reduced, and very efficient multiplexed communication can be implemented.

In the above exemplary embodiments, an example has been described in which IP packets are multiplexed. However, the present invention is not limited to this. For example, as the user packet 10A to be input to the transmission processing apparatus 10, a PDU (Protocol Data Unit) of GTP-U is also usable. In this case, the header information of the PDU is used as the header information 11A, and the attribute information 12A associated with the PDU is extracted from the header information. Additionally, since a field representing a sequence number is already inserted, the header of the multiplexed packet need not include the sequence number as the multiplex information 31.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed:

1. A multiplexed communication system comprising a transmission processing apparatus and a reception processing apparatus which perform packet communication via a communication network based on GTP-U (GPRS Tunneling Protocol for User plane) defined by an LTE (Long Term Evolution) communication technique of 3GPP (3rd Generation Partnership Project), the transmission processing apparatus comprising:

a storage unit which stores user management information representing a correspondence relationship between destination user information to identify a destination user of a user packet and a multiplex flag position of the destination user;

a packet input unit which temporarily stores an input user packet in an input buffer;

a header analyzing unit which extracts, from a header of the input user packet, attribute information containing a packet size of the user packet;

a multiplexed packet combination selection unit which selects, based on the attribute information extracted by said header analyzing unit and flow control information according to a storage state of a reception buffer sent from the reception processing apparatus, user packets to be multiplexed into a new multiplexed packet from user packets stored in the input buffer; and a packet multiplexing unit which reads out the user packets selected by said multiplexed packet combination selection unit from the input buffer, stores the user packets in a payload of the new multiplexed packet based on an order of multiplex flag positions corresponding to the destination users of the user packets registered in the user management information read out from said storage unit, stores, in a header of the new multiplexed packet as header extension information based on the LTE communication technique, a multiplex flag group in which, out of multiplex flags provided for the respective destination users, multiplex flags corresponding to the destination users of the user packets selected by said multiplexed packet combination selection unit are set, and remaining multiplex flags are reset, and transmits the new multiplexed packet to the reception processing apparatus via the communication network, and the reception processing apparatus comprising:

a storage unit which stores user management information representing a correspondence relationship between destination user information to identify a destination user of a user packet and a multiplex flag position of the destination user;

a packet reception unit which temporarily stores, in the reception buffer, a multiplexed packet received from the transmission processing apparatus;

a header analyzing unit which extracts, from a header of the multiplexed packet, a multiplex flag group stored as header extension information based on the LTE communication technique, and transmits the flow control information according to the storage state of the reception buffer to the transmission processing apparatus; and a packet demultiplexing unit which demultiplexes user packets from a payload of the multiplexed packet read out from the reception buffer, extracts, from the user management information read out from said storage unit, destination user information corresponding to a set multiplex flag out of the multiplex flag group extracted by said header analyzing unit, and outputs the user packets to the destination users of the destination user information corresponding to the multiplex flags based on a correspondence relationship between a position order of the multiplex flags and a storage order of the user packets in the payload.

2. A system according to claim 1, wherein said storage unit of the transmission processing apparatus stores, as the user management information, information representing a correspondence relationship between destination user information, a multiplex flag position, and a group identifier of a group to which the destination user belongs, when selecting the user packets to be stored in the new multiplexed packet based on the attribute information and the flow control information, said multiplexed packet combination selection unit selects the user packets from user packets of destination users having the same group identifier based on the group identifier of the user management information, said packet multiplexing unit stores a group identifier corresponding to each user packet selected by said multiplexed packet combination selection unit in the header of the new multiplexed packet, said storage unit of the reception processing apparatus stores, as the user management information, information representing a correspondence relationship between destination user information, a multiplex flag position, and a group identifier of a group to which the destination user belongs, and when extracting the destination user information from the user management information, said packet demultiplexing unit extracts, from the pieces of destination user information having the same group identifier as the group identifier stored in the header of the new multiplexed packet, destination user information corresponding to a multiplex flag position of a set multiplex flag out of the multiplex flag group extracted by said header analyzing unit.

3. A transmission processing apparatus for performing packet communication with a reception processing apparatus via a communication network based on GTP-U (GPRS Tunneling Protocol for User plane) defined by an LTE (Long Term Evolution) communication technique of 3GPP (3rd Generation Partnership Project), comprising:

a storage unit which stores, for each of destination users to be multiplexed, user management information registering group identifiers for identifying groups to which individual destination users belong, destination user information for identifying the destination user of a user packet, and a multiplex flag position of the destination user;

a packet input unit which temporarily stores an input user packet in an input buffer;

a header analyzing unit which extracts, from a header of the input user packet, attribute information containing a packet size of the user packet, internal identification information for identifying the user packet, and destination user information representing the destination user of the user packet;

a multiplexed packet combination selection unit which, when a processing timing has come for any groups out of the groups of destination users, selects from user packets stored in the input buffer those user packets of which group identifiers, identified by the user management information thereof based on the destination user information contained in the attribute information of the user packets, that match the group identifiers of any such groups as candidate user packets, to thereby then select user packets to be multiplexed into a new multiplexed packet from the thus selected candidate user packets so that a total size of the thus selected user packets does not exceed a remaining storage capacity of a reception buffer notified from the reception processing apparatus; and a packet multiplexing unit which reads out the user packets selected by said multiplexed packet combination selection unit from the input buffer, stores the thus read out user packets in a payload of the new multiplexed packet, stores, in a header of the new multiplexed packet as header extension information based on the LTE communication technique, a multiplex flag group in which, out of multiplex flags provided for the respective destination users, multiplex flags corresponding to the destination users of the user packets selected by said multiplexed packet combination selection unit are set and stored in the payload of the new multiplexed packet, and remaining multiplex flags are reset, stores the group identifiers of the user packets in the header of the new multiplexed packet, and transmits the new multiplexed packet to the reception processing apparatus via the communication network.

4. A reception processing apparatus for performing packet communication with a transmission processing apparatus via a communication network based on GTP-U (GPRS Tunneling Protocol for User plane) defined by an LTE (Long Term Evolution) communication technique of 3GPP (3rd Generation Partnership Project), comprising:

a storage unit which stores, for each of destination users to be multiplexed, user management information registering group identifiers for identifying groups to which individual destination users belong, destination user information for identifying the destination user of a user packet, and a multiplex flag position of the destination user;

a packet reception unit which temporarily stores, in a reception buffer, a multiplexed packet received from the transmission processing apparatus;

a header analyzing unit which extracts, from a header of the multiplexed packet, a multiplex flag group stored as header extension information based on the LTE communication technique, and transmits a remaining storage capacity of the reception buffer to the transmission processing apparatus; and a packet demultiplexing unit which, based on the multiplex flag group extracted by the header analyzing unit, demultiplexes user packets from a payload of the multiplexed packet, extracts group identifiers of the thus demultiplexed user packets from the header of the multiplexed packet, extracts from the user management information in said storage unit destination user information corresponding to the extracted group identifier and corresponding to a set multiplex flag out of the multiplex flag group, and outputs the user packets demultiplexed from the payload to the destination users of the destination user information corresponding to the multiplex flags based on a correspondence relationship between a position order of the multiplex flags and a storage order of the user packets in the payload.

5. A multiplexed communication method of performing communication between a transmission processing apparatus and a reception processing apparatus via a communication network, using a new multiplexed packet in which a plurality of user packets are multiplexed, based on GTP-U (GPRS Tunneling Protocol for User plane) defined by an LTE (Long Term Evolution) communication technique of 3GPP (3rd Generation Partnership Project), comprising the steps of:

causing the transmission processing apparatus to temporarily store an input user packet in an input buffer;

causing the transmission processing apparatus to extract, from a header of the user packet, attribute information containing a packet size of the user packet;

causing the transmission processing apparatus to select, based on the extracted attribute information and flow control information according to a storage state of a reception buffer sent from the reception processing apparatus, user packets to be multiplexed into the new multiplexed packet from user packets stored in the input buffer;

causing the transmission processing apparatus to read out the selected user packets from the input buffer;

causing the transmission processing apparatus to store the readout user packets in a payload of the new multiplexed packet based on an order of multiplex flag positions corresponding to the destination users of the readout user packets, which are registered in user management information representing a correspondence relationship between destination user information to identify a destination user of a user packet and a multiplex flag position of the destination user;

causing the transmission processing apparatus to store, in a header of the new multiplexed packet as header extension information based on the LTE communication technique, a multiplex flag group in which, out of multiplex flags provided for the respective destination users, multiplex flags corresponding to the destination users of the selected user packets are set, and remaining multiplex flags are reset;

transmitting the new multiplexed packet from the transmission processing apparatus to the reception processing apparatus;

causing the reception processing apparatus to temporarily store, in the reception buffer, a multiplexed packet received from the transmission processing apparatus;

transmitting the flow control information according to the storage state of the reception buffer from the reception processing apparatus to the transmission processing apparatus;

causing the reception processing apparatus to extract, from a header of the multiplexed packet, a multiplex flag group stored as header extension information based on the LTE communication technique;

causing the reception processing apparatus to demultiplex user packets from a payload of the multiplexed packet read out from the reception buffer; and causing the reception processing apparatus to extract, from user management information representing a correspondence relationship between destination user information to identify a destination user of a user packet and a multiplex flag position of the destination user, destination user information corresponding to a set multiplex flag out of the extracted multiplex flag group, and output the user packets to the destination users of the destination user information corresponding to the multiplex flags based on a correspondence relationship between a position order of the multiplex flags and a storage order of the user packets in the payload.

6. A transmission processing method in performing packet communication via a communication network based on GTP-U (GPRS Tunneling Protocol for User plane) defined by an LTE (Long Term Evolution) communication technique of 3GPP (3rd Generation Partnership Project), comprising the steps of:

storing, for each of destination users to be multiplexed, user management information registering group identifiers for identifying groups to which individual destination users belong, destination user information for identifying the destination user of a user packet, and a multiplex flag position of the destination user;

temporarily storing an input user packet in an input buffer;

extracting, from a header of the input user packet, attribute information containing a packet size of the user packet, internal identification information for identifying the user packet, and destination user information representing the destination user of the user packet;

when a processing time has come for any groups out of the groups of destination users, selecting from user packets stored in the input buffer those user packets of which group identifiers, identified by the user management information thereof based on the destination user information contained in the attribute information of the user packets, that match the group identifiers of any such groups as candidate user packets, to thereby then select user packets to be multiplexed into a new multiplexed packet from the thus selected candidate user packets so that a total size of the thus selected user packets does not exceed a remaining storage capacity of a reception buffer;

reading out the user packets selected from the input buffer;

storing the thus read out user packets in a payload of the new multiplexed packet;

storing, in a header of the new multiplexed packet as header extension information based on the LTE communication technique, a multiplex flag group in which, out of multiplex flags provided for the respective destination users, multiplex flags corresponding to the destination users of the user packets selected are set and stored in the payload of the new multiplexed packet, and remaining multiplex flags are reset;

storing the group identifiers of the user packets in the header of the new multiplexed packet; and transmitting the new multiplexed packet.

7. A reception processing method in performing packet communication via a communication network based on GTP-U (GPRS Tunneling Protocol for User plane) defined by an LTE (Long Term Evolution) communication technique of 3GPP (3rd Generation Partnership Project), comprising the steps of:

storing, for each of destination users to be multiplexed, user management information registering group identifiers for identifying groups to which individual destination users belong, destination user information for identifying the destination user of a user packet, and a multiplex flag position of the destination user;

temporarily storing, in a reception buffer, a multiplexed packet received from a transmission processing apparatus;

extracting, from a header of the multiplexed packet, a multiplex flag group stored as header extension information based on the LTE communication technique;

transmitting a remaining storage capacity of the reception buffer to the transmission processing apparatus;

based on the multiplex flag group that has been extracted, demultiplexing user packets from a payload of the multiplexed packet;

extracting group identifiers of the thus demultiplexed user packets from the header of the multiplexed packet;

extracting from the user management information destination user information corresponding to the extracted group identifier and corresponding to a set multiplex flag out of the multiplex flag group;

outputting the user packets demultiplexed from the payload to the destination users of the destination user information corresponding to the multiplex flags based on a correspondence relationship between a position order of the multiplex flags and a storage order of the user packets in the payload.

* * * * *